(No Model.)
W. W. DUNN.
WHEEL.
No. 341,462. Patented May 11, 1886.
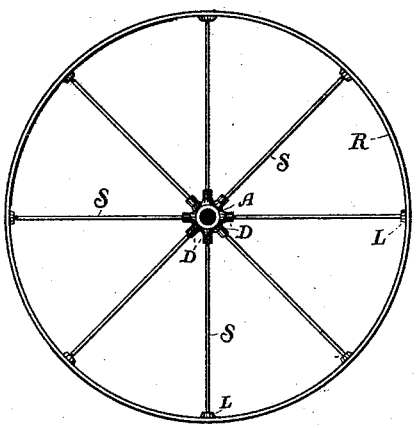
Fig. 1.
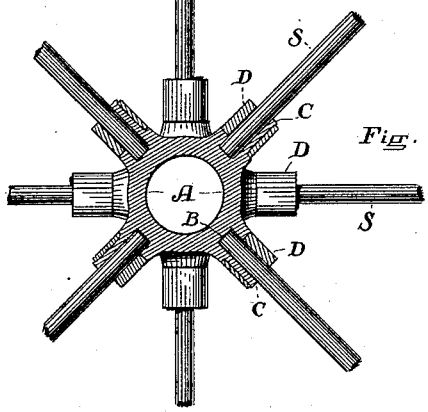
Fig. 2.
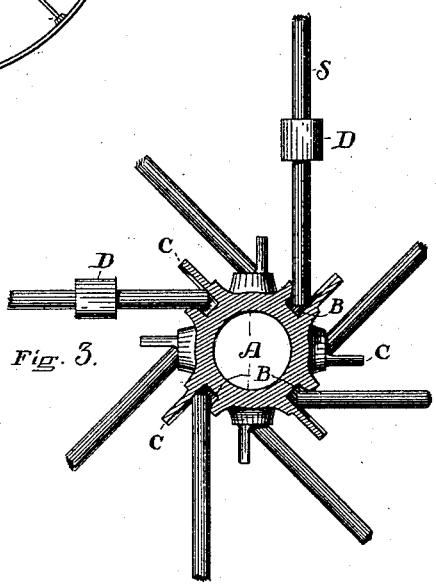
Fig. 3.
Fig. 5.
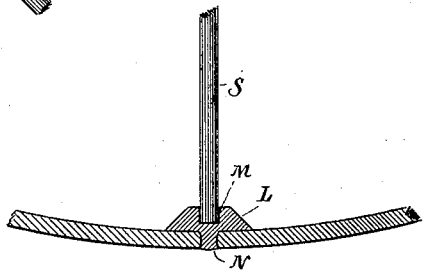
Fig. 4.
Witnesses;
A. H. Holmes.
A. Keithley
Inventor,
William W. Dunn,
by A. B. Upham,
His Attorney.

UNITED STATES PATENT OFFICE.

WILLIAM W. DUNN, OF PEORIA, ILLINOIS.

WHEEL.

SPECIFICATION forming part of Letters Patent No. 341,462, dated May 11, 1886.

Application filed December 7, 1885. Serial No. 184,904. (No model.)

*To all whom it may concern:*

Be it known that I, WILLIAM W. DUNN, of Peoria, in the county of Peoria and State of Illinois, have invented an Improved Wheel; and I do hereby declare that the following is a full, clear, and exact description thereof, reference being had to the annexed drawings, making a part of this specification, in which like letters of reference refer to like parts, and in which—

Figure 1 represents an elevation of the wheel; Fig. 2, a detail sectional view of the hub and spokes; Fig. 3, a similar view with hub and spokes relatively turned; Fig. 4, a socket-piece; Fig. 5, a ferrule.

This invention is in the line of all-metal wheels in which the spokes are light rods held in place otherwise than by casting the hub and rim about their ends; and the special design of this invention is the construction of simple and more efficient means for fastening together the hub, spokes, and rim.

In the drawings, A is the hub of the wheel. S are the spokes, and R is the rim. The spokes S are of equal length, and preferably formed of light rod-iron.

In the exterior of the hub A are sockets B, made somewhat shallow and equal in number to the spokes desired. At one side of each of said sockets is formed a radial projection, C, as shown in Fig. 3.

D D, &c., are ferrules, the openings through which are equal in dimension to the added diameters of the spokes and projections C. The length of each projection C is slightly more than the length of each ferrule.

The rim R is formed with sockets M for the reception of the ends of the spokes S. In case the rim is cast, said sockets are of course formed with the same; but when the rim is made of wrought-iron said sockets are formed in separate pieces adapted to be secured to the rim. These socket-pieces L, I usually make, as shown in Fig. 4, with the projection N, which, by being inserted through a suitable hole in the rim and the end of said projection or lug hammered or peened, securely holds the socket-piece in place. The projections C, it should be understood, are on corresponding sides of the sockets B, so that, having inserted the ends of the spokes in said sockets, a partial turn in one direction of the hub will move said projections toward the spokes and parallel thereto, and an opposite turn will move the same apart.

Fig. 2 shows the projections C against the spokes S, and Fig. 3 the spokes and projections apart.

The ferrules D, I usually make with their openings and exterior surfaces somewhat eccentric, as shown in Fig. 5, so that the increased thickness of one side of each shall make up for the projection, and thereby make the spoke and its ferrule concentric, as in Fig. 2.

In putting my wheel together the rim R and hub A are placed concentric, but relatively revolved sufficiently to bring the sockets B of the hub tangential relative to the corresponding sockets, L, of the rim. The ends of the spokes S can now be inserted into the sockets L and at the mouths of the sockets B, as in Fig. 3, a ferrule, D, having previously been put on each spoke. The hub is then forcibly turned relative to the rim until the spokes are radial and the projections C snug against the same. Having pressed the ferrules in place and peened the ends of the projections C just reaching through, the whole is strongly bound together and the wheel is completed.

In case the wheel is designed to be made a suspension wheel—that is, one in which the hub and rim are held together by the tension of the spokes—I enlarge the extremities of the spokes, so that the same cannot be withdrawn through the ferrules, and said ferrules being held by the terminal enlargement of the projections C. The socket-pieces M being each formed with one or two projections similar to those on the hub and supplied with ferrules, the spokes can be also fastened to the rim. I have shown in the drawings a ferrule and projection for each spoke; but in many wheels it may be sufficient to have but a part of the spokes thus braced.

In Figs. 2 and 3 of the drawings the section of view is through the centers of but half of the spokes, the wheel being represented as of the staggered-spoke kind. I do not restrict myself, however, to such kind of wheel, as my mode of securing the spokes to the hub is equally applicable to wheels in which the spokes are all in the same plane; neither do I restrict myself to all-metal wheels, as the spokes and rim can be of wood and the hub made of metal sufficiently to include and make the projections C perfectly solid.

What I claim as my invention, and for which I desire Letters Patent, is as follows, to wit:

1. The combination, in a wheel, of the rim R, having sockets M, the hub A, having shallow sockets B and radial projections C, the spokes S, adapted to enter said sockets, and the ferrules D, substantially as set forth.

2. In a wheel, a hub having the radial projections C, in combination with spokes S and ferrules D, adapted to encircle said projections and spokes, as described, for the purpose specified.

In testimony that I claim the foregoing as my invention I have hereunto set my hand and affixed my seal this 2d day of December, 1885.

WILLIAM W. DUNN. [L. S.]

In presence of—
 A. H. HOLMES,
 A. KEITHLEY.